UNITED STATES PATENT OFFICE

CHAUNCEY ALLAN LYFORD, OF EAST AURORA, NEW YORK, ASSIGNOR TO NATIONAL ANILINE & CHEMICAL COMPANY, INC., OF NEW YORK, N. Y., A CORPORATION OF NEW YORK

STILBENE DYE AND PROCESS OF PRODUCING THE SAME

No Drawing.   Application filed February 1, 1929.   Serial No. 336,924.

This invention relates to the preparation of dyestuffs derived from stilbene (diphenylethylene). It relates particularly to improvements in the manufacture of stilbene azo dyestuffs by the reduction of 4.4'-dinitrostilbene-2.2'-disulfonic acid in an alkaline medium, said improvements comprising the employment as reducing agent of an aldehyde having the formula RCHO (in which R represents hydrogen, a non-hydroxylic aliphatic hydrocarbon radical, or a furfuryl radical). The invention also includes new dyestuffs resulting from said improved process.

The production of yellow cotton dyes which are azo derivatives of stilbene-2.2'-disulfonic acid heretofore has been usually carried out by one of two generally known methods of procedure. In accordance with one method, p-nitro toluene-o-sulfonic acid is heated with a strong caustic alkali solution under varying conditions of concentration and temperature (cf. U. S. Patent No. 360,553). In accordance with the other method, 4.4'-dinitro stilbene-2.2'-disulfonic acid is treated with a reducing agent, such as, glucose, in a caustic alkali medium.

The dyes obtained by either of these known methods are generally regarded as comprising mixtures of different proportions of dinitro-azo, azoxy-azo, and disazo derivatives of stilbenedisulfonic acid together with varying amounts of other products, such as, diamino stilbene-disulfonic acid. These azo derivatives have, respectively, the probable formulas:

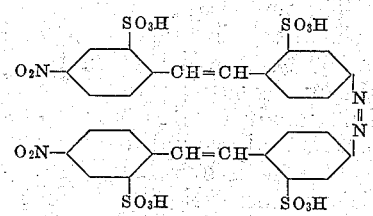

(Colour Index No. 622)

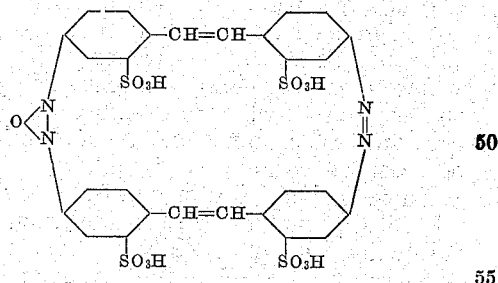

(Colour Index No. 620)

and

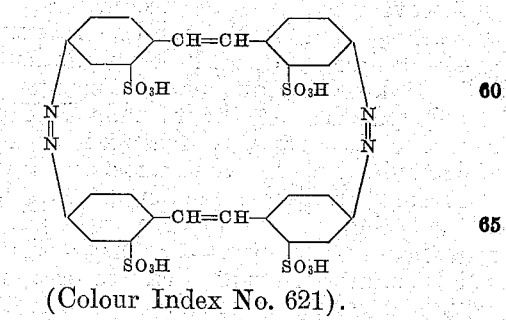

(Colour Index No. 621).

The more of the dinitro-derivative there is present in the dye, the greener the shade of the dyeing made therewith; and the more of the disazo-derivative there is present, the redder the shade.

In order to obtain dyestuffs giving dyeings of a greenish-yellow shade by the reduction 4.4'-dinitro stilbene-2.2'-disulfonic acid, it has heretofore been proposed to reduce dinitro stilbene-disulfonic acid with a minimum amount of glucose, whereby only a part of the dinitro stilbene-disulfonic acid is reduced and low yields of dyestuff are obtained. Owing to the vigorous reducing action of the glucose, contaminating higher reduction products are also produced even when the minimum amount of glucose is employed. In order to obtain dyestuffs giving the redder shades, it has been proposed to carry out the reduction under more drastic conditions, whereby diamino stilbene and other over-reduction products are formed, decreasing the purity and the yield of dyestuff.

One of the objects of the invention is the production of dyestuffs from dinitro stilbene-disulfonic acid in increased yield.

Another object of the invention is an improvement in the process of producing dyestuffs from dinitro stilbene-disulfonic acid whereby the shade of the resulting dyestuff can be controlled without deleteriously affecting the yield of dyestuff.

Another object of the invention is an improvement in the process of producing dyestuffs from dinitro stilbene-disulfonic acid whereby not only are products obtained which give dyeings of bright shade, but they are obtained in good yield.

Another object of the invention is the production of a yellow stilbene dye which dyes cotton greener and brighter shades than the yellow stilbene dyes formerly produced, which dyes paper bright greenish-yellow shades, and which forms with barium chloride and basic aluminum hydroxide bright, greenish-yellow, clear color-lakes.

These and other objects of the invention will be apparent from a consideration of the following disclosure which is given for the purpose of illustrating the invention.

The present invention is based upon the discovery that if in the production of a stilbene dyestuff by the alkaline reduction of 4.4'-dinitro stilbene-2.2'-disulfonic acid there is employed a reducing agent comprising an aldehyde having the formula RCHO (in which R represents hydrogen, a non-hydroxylic aliphatic hydrocarbon radical, or a furfuryl radical), particularly, formaldehyde, the process can be more readily controlled, and dyestuffs of a bright shade can be obtained in yields that are greater than those formerly obtained.

In carrying out the process in accordance with the present invention, 4.4'-dinitro stilbene-2.2'-disulfonic acid is treated in an aqueous caustic alkali solution with a solution of an aldehyde of the above type (for example, formaldehyde, acetaldehyde, furfural, or equivalent aldehyde), more particularly, a non-hydroxylic aliphatic aldehyde, and specifically, formaldehyde. By varying the concentration of the alkali, the reaction temperature, and the quantity of aldehyde, dyestuffs can be obtained which vary in color from greenish-yellow to red, which dissolve in concentrated sulfuric acid forming solutions ranging in color from orange-yellow to red to purple, and which dye cotton from a neutral salt bath greenish-yellow to orange shades. For example, by heating 1 mol of 4.4'-dinitro stilbene-2.2'-disulfonic acid in an aqueous caustic alkali solution, containing about 5 to 6 mols of caustic alkali, with about 4 mols of a non-hydroxylic aliphatic aldehyde, such as, formaldehyde, at a temperature of about 55°–70° C., a dyestuff which dyes cotton greenish-yellow shades can be obtained in relatively high yield.

By increasing the extent of the reduction, for example, by increasing the quantity of alkali, and/or by operating under more elevated temperature conditions, and/or by increasing the quantity of the aldehyde, dyestuffs can be obtained which give dyeings of redder shades. Thus, in the above reduction, if about 7 mols of formaldehyde and about 10 mols of caustic alkali are employed, a dyestuff which dyes cotton orange shades can be obtained in relatively high yield with formation of a relatively small amount, if any, of over-reduction products.

The invention will be further described in connection with the following specific examples which are given for the purpose of illustration. The parts are by weight.

*Example 1.*—60 parts of 4.4'-dinitro stilbene-2.2'-disulfonic acid disodium salt, in the form of a 50 per cent paste with water, is suspended with agitation in 500 parts of water. The suspension is heated to 50° C. whereby a clear yellowish solution forms. While continuing the agitation there is added 65 parts of a 47° Bé. sodium hydroxide solution (containing about 30 parts of NaOH) and the agitation is further continued until a homogeneous, light yellow colored, creamy paste results. The temperature spontaneously rises to about 56°–57° C. If the temperature does not rise to about 57° C., the mixture is brought to that temperature, and 43.7 parts of a 37 per cent formaldehyde solution (containing about 16 parts HCHO) is added in small portions, the addition being so regulated as to require from about 12 to about 15 minutes for its completion. During the addition of the formaldehyde the temperature rises to about 70° C., the reaction mixture forms a deep orange colored solution, and the resulting dyestuff commences to crystallize out. After the addition of the formaldehyde, agitation is continued for an additional period of about 3 hours, the temperature being allowed gradually to drop to about 60°–62° C. By this time the dyestuff should be completely crystallized, as shown by spotting upon filter paper. 50° Bé. sulfuric acid is then added to the batch until neutral to brilliant yellow and Congo papers, about 38.5 parts of said acid ordinarily being required. The temperature rises to about 70° C. and the batch is agitated until it falls to about 55° C. at which point the mixture is filtered on a suction filter. The dyestuff is dried in the air at a temperature of about 80° to 90° C., and ground to a powder. The powder obtained is of a bright red color, is soluble in concentrated sulfuric acid with an orange color, and dyes cotton directly in bright yellow shades.

*Example 2.*—Dinitro stilbene-disulfonic acid disodium salt is treated according to the method of Example 1, with the difference that instead of 65 parts of 47° Bé. caustic soda solution and 43.7 parts of a 37 per cent solution of formaldehyde there are used 58 parts of a 47° Bé. sodium hydroxide solution and about 30 to 38, preferably about 35, parts of a 37 per cent solution of formaldehyde. The dyestuff thereby obtained, which is of a greener shade of yellow than that of Example 1, appears to be a new product inasmuch as it gives dyeings on cotton of a greener and brighter shade than do those stilbene dyestuffs hitherto produced by the reduction of dinitro stilbene-disulfonic acid. It dissolves in concentrated sulfuric acid with a yellowish-orange coloration, dyes paper bright greenish-yellow shades, and forms with barium chloride and basic aluminum hydroxide clear and bright greenish-yellow color-lakes.

It will be understood that the invention is not limited to the above examples. Thus, the quantity of formaldehyde may be varied from about 0.5 to about 1.25 parts of formaldehyde solution per part of dinitro stilbene-disulfonic acid disodium salt, or from about 3 to about 8 mols of formaldehyde per mol of dinitro stilbene-disulfonic acid disodium salt; and in the preparation of the new dyestuff of Example 2, the formaldehyde may vary in amount from about 3 to about 3.7 mols of formaldehyde per mol of dinitro stilbene-disulfonic acid. Instead of formaldehyde, there may be used equivalent proportions of other aldehydes which conform with the formula RCHO, wherein R is a non-hydroxylic aliphatic hydrocarbon radical (such as, $CH_3$, $C_2H_5$, etc.) or a furfuryl radical; specifically, acetaldehyde or furfural. The amount of caustic alkali employed may also vary. Although about 5 to about 10 mols of sodium hydroxide per mol of dinitro stilbene-disulfonic acid disodium salt is preferred, the minimum amount that generally may be employed is that quantity necessary both to produce sodium formate with the formaldehyde present and to provide a sufficiently concentrated sodium hydroxide solution to enable the condensation reaction to occur. Instead of a 47° Bé. sodium hydroxide solution and a 37 per cent formaldehyde solution, proportionate quantities of solutions of other strengths may be used. The temperature of the reaction may be varied from about 50° to about 90° C., and is preferably maintained between about 55° to about 75° C. Other mineral acids besides sulfuric acid may be used in neutralizing the reaction mixture, such as, hydrochloric acid; and the strength of said mineral acid may vary, as will be readily understood. The dyestuff is preferably filtered at above about 50° C. when sulfuric acid has been used to neutralize the excess caustic, in order to avoid the precipitation of sodium sulfate; but when another acid, such as, hydrochloric acid, has been used, this precaution need not be taken, and the dyestuff may be filtered at lower temperatures.

It will be noted that the extent of reduction and thereby the greenness or redness of the shade imparted to cotton dyed with the dyestuff will depend upon the reducing power of the aldehyde and caustic solutions as well as upon the temperature of the reaction; a more concentrated aldehyde, a more concentrated sodium hydroxide solution, and a higher temperature causing a greater degree of reduction and consequently a redder shade.

The dyestuffs obtained in accordance with this invention may be used for the direct dyeing of cotton and paper in greenish-yellow to orange shades, and for the production of clear greenish-yellow to orange color lakes by precipitation of said dyestuffs with barium chloride upon basic aluminum hydroxide.

The process of this invention as above described is easily controlled and enables the production of stilbene azo dyes of the desired shade without a decrease of the yield of dyestuff and without danger of over-reduction.

I claim:

1. In the production of a stilbene dyestuff by a process comprising the reduction of 4.4'-dinitrostilbene-2.2'-disulfonic acid in an alkaline medium, the improvement which comprises reducing 4.4'-dinitro stilbene-2.2'-disulfonic acid with an aldehyde having the formula RCHO, wherein R represents hydrogen, a non-hydroxylic aliphatic hydrocarbon radical, or a furfuryl radical.

2. In the production of a stilbene dyestuff by a process comprising the reduction of 4.4'-dinitro stilbene-2.2'-disulfonic acid in an alkaline medium, the improvement which comprises reducing 4.4'-dinitro stilbene-2.2'-disulfonic acid with a non-hydroxylic aliphatic aldehyde.

3. In the production of a stilbene dyestuff by a process comprising the reduction of 4.4'-dinitro stilbene-2.2'-disulfonic acid in an alkaline medium, the improvement which comprises reducing 4.4'-dinitro stilbene-2.2'-disulfonic acid with formaldehyde.

4. In the production of a stilbene dyestuff by a process comprising the reduction of 4.4'-dinitro stilbene-2.2'-disulfonic acid in a caustic alkali medium, the improvement which comprises reducing 4.4'-dinitro stilbene-2.2'-disulfonic acid with an aldehyde having the formula RCHO, wherein R represents hydrogen, a non-hydroxylic aliphatic hydrocarbon radical, or a furfuryl radical, at a temperature of about 50° to about 90° C.

5. In the production of a stilbene dyestuff by a process comprising the reduction of 4.4'-dinitro stilbene-2.2'-disulfonic acid in a caustic alkali medium, the improvement which comprises reducing 4.4'-dinitro stilbene-2.2'-disulfonic acid with a non-hydroxylic aliphatic aldehyde, at a temperature of about 50° to about 90° C.

6. In the production of a stilbene dyestuff by a process comprising the reduction of 4.4'-dinitro stilbene-2.2'-disulfonic acid in a caustic alkali medium, the improvement which comprises reducing 4.4'-dinitro stilbene-2.2'-disulfonic acid with formaldehyde, at a temperature of about 50° to about 90° C.

7. In the production of a stilbene dyestuff by a process comprising the reduction of 4.4'-dinitro stilbene-2.2'-disulfonic acid in an alkaline medium, the improvement which comprises heating 4.4'-dinitro stilbene-2.2'-disulfonic acid with caustic alkali and an aldehyde having the formula RCHO, wherein R represents hydrogen, a non-hydroxylic aliphatic hydrocarbon radical, or a furfuryl radical, in the proportion of about 3 to about 8 mols of aldehyde per mol of dinitro stilbene-disulfonic acid.

8. In the production of a stilbene dyestuff by a process comprising the reduction of 4.4'-dinitro stilbene-2.2'-disulfonic acid in an alkaline medium, the improvement which comprises heating 4.4'-dinitro stilbene-2.2'-disulfonic acid with caustic alkali and with a non-hydroxylic aliphatic aldehyde in the proportion of about 3 to about 8 mols of aldehyde per mol of dinitro stilbene-disulfonic acid.

9. In the production of a stilbene dyestuff by a process comprising the reduction of 4.4'-dinitro stilbene-2.2'-disulfonic acid in an alkaline medium, the improvement which comprises heating 4.4'-dinitro stilbene-2.2'-disulfonic acid with caustic alkali and with formaldehyde in the proportion of about 3 to about 8 mols of formaldehyde per mol of dinitro stilbene-disulfonic acid.

10. In the production of a stilbene dyestuff by a process comprising the reduction of 4.4'-dinitro stilbene-2.2'-disulfonic acid, the improvement which comprises heating 4.4'-dinitro stilbene-2.2'-disulfonic acid with aqueous caustic alkali and with an aldehyde having the formula RCHO, wherein R represents hydrogen, a non-hydroxylic aliphatic hydrocarbon radical, or a furfuryl radical, in the proportion of about 3 to about 8 mols of aldehyde per mol of dinitro stilbene-disulfonic acid, at a temperature of about 50° to about 75° C.

11. In the production of a stilbene dyestuff by a process comprising the reduction of 4.4'-dinitro stilbene-2.2'-disulfonic acid, the improvement which comprises heating 4.4'-dinitro stilbene-2.2'-disulfonic acid with aqueous caustic alkali and with formaldehyde in the proportion of about 3 to about 8 mols of formaldehyde per mol of dinitro stilbene-disulfonic acid, at a temperature of about 50° to about 75° C.

12. The process of producing a stilbene dyestuff which comprises heating 4.4'-dinitro stilbene-2.2'-disulfonic acid with an aqueous sodium hydroxide solution and with a non-hydroxylic aliphatic aldehyde in the proportion of about 3 to about 3.7 mols of aldehyde per mol of dinitro stilbene-disulfonic acid, at a temperature of about 50° to about 75° C.

13. The process of producing a stilbene dyestuff which comprises heating 4.4'-dinitro stilbene-2.2'-disulfonic acid with an aqueous sodium hydroxide solution and formaldehyde in the proportions of about 5 to about 6 mols of sodium hydroxide and about 3 to about 3.7 mols of formaldehyde per mol of dinitro stilbene-disulfonic acid, at a temperature of about 50° to about 70° C.

14. A stilbene dye obtainable by reducing 1 mol of 4.4'-dinitro stilbene-2.2'-disulfonic acid disodium salt in an aqueous sodium hydroxide medium, containing about 5 to about 6 mols of sodium hydroxide, with from about 3 to about 3.7 mols of formaldehyde, at a temperature of about 50° to about 70° C.; said dye being an orange powder, dissolving in concentrated sulfuric acid with a light orange coloration, dyeing cotton from a neutral salt bath bright greenish-yellow shades, and forming with barium chloride and basic aluminum hydroxide clear greenish-yellow color-lakes.

15. A stilbene dye obtained by reducing 4.4'-dinitro stilbene-2.2'-disulfonic acid in an alkaline medium with a non-hydroxylic aliphatic aldehyde, said dye being a greenish yellow to red powder, dissolving in concentrated sulfuric acid with an orange yellow to red coloration, dyeing cotton from a neutral salt bath bright greenish yellow to orange shades, and forming with barium chloride and basic aluminum hydroxide clear greenish yellow to orange color lakes.

In testimony whereof I affix my signature.
CHAUNCEY ALLAN LYFORD.